Patented June 2, 1936

2,043,067

UNITED STATES PATENT OFFICE 2,043,067

PRODUCTION OF COARSELY CRYSTALLINE AMMONIUM SULPHATE

Carl Rumscheidt, Arnold Jeltsch, Anton Strzyzewski, and Heinrich Hegge, Leuna, Germany, assignors to I. G. Farbenindustrie Aktiengesellschaft, Frankfort-on-the-Main, Germany No Drawing. Original application January 10, 1935, Serial No. 1,156. Divided and this application November 22, 1935, Serial No. 51,092. In Germany February 22, 1934

5 Claims. (Cl. 23—119)

The present invention relates to the production of coarsely crystalline ammonium sulphate.

Several methods have already been proposed for the prepartion of coarsely crystalline ammonium sulphate, some of which have found industrial application. These proposals consist mainly either in the use of special stirring methods or in the use of certain soluble inorganic or organic additional substances. While in the first-mentioned method the growth of the small crystals is promoted without changing their shape by keeping them in a state of suspension in the supersaturated solution, the said substances added to the solution to be evaporated cause a change in shape of the crystals in the sense of an increase of size in a certain direction. These additional substances may consist of salts of certain metals, as for example iron, chromium or aluminium, or certain organic compounds, especially sulphonic acids may be used.

An important condition when employing such additional substances is usually the maintenance of a definite concentration of acid in the solution to be evaporated. This concentration is sometimes so high that the acid content of the dry salt exceeds the limit permissible in commerce so that the salt must be subjected to a special after-treatment. The necessary concentration of acid may also cause corrosion of the material of the salt-producing plant and thereby render the carrying out of the process impossible.

Of the said additional substances, aluminium salts have hitherto been specially favored. Since they are colorless salts, they cause no undesirable discoloration of the product. By the addition of aluminium salts, however, comparatively elongated thin crystals are frequently obtained which tend to break and also have the objection of matting together, their drying being thereby rendered difficult. The said difficulties can partly be obviated by a correspondingly high addition of acid, a subsequent neutralization of the resulting salt with ammonia then being necessary.

We have now found that when evaporating a solution of ammonium sulphate in the presence of salts of aluminium a specially coarsely crystalline product having good stability in storage is obtained by adding to the solution not only salts of aluminium but also a water-soluble salt of a metal selected from the group consisting of sodium, potassium, magnesium, zinc and manganese, the sulphates of which are soluble in water. When working in this manner the acid concentration to be maintained is so slight that no subsequent neutralization of the salt is necessary. The ammonium sulphate crystals obtained are distinguished by a great resistance so that breakage of the crystals, as for example in transport, is avoided. They are superior both as regards stability and size of the crystals to those obtained in the presence of aluminium salts alone at a correspondingly high acid concentration. The added salts may be employed for example in the form of sulphates, chlorides or acetates or in other readily soluble form. Even small amounts of the said salts are sufficient to produce a coarse crystal form well amenable to handling, instead of the needle-shaped crystal form which arises when employing aluminium salts alone as the additional substances.

With a given speed of crystallization and a definite permissible acid concentration, the speed of growth of the crystals different along the longitudinal and transverse axes can be so influenced by the selection of a suitable ratio of proportions of aluminium salt and additional salt that the ammonium sulphate obtained fulfills the requirements as to crystal size and that breakage of the crystals is avoided. Furthermore, by suitable selection of the ratio of proportions of the additional substances, the evaporation conditions, speed of evaporation and acid concentration may be varied within wide limits without the desired crystal form being appreciably altered. For example there may be employed, with reference to the dissolved ammonium sulphate, from 0.05 to 1 per cent of common salt, magnesium sulphate or zinc sulphate and from 0.02 to 0.005 per cent of $Al_2O_3$ in the form of salt.

Accordingly the use of a mixture of additional substances according to the invention, contrasted with the use of aluminium salts alone as additional substances, offers considerable advantages in operation and in some cases an economical preparation of coarsely crystalline ammonium sulphate is rendered possible thereby for the first time.

The following examples will further illustrate the nature of this invention but the invention is not restricted to these examples.

Example 1

Ammonium sulphate solution containing about 500 grams per liter is evaporated until the precipitation of the ammonium sulphate, in a simplex evaporator working under a pressure of about from 0.5 to 0.6 atmosphere, the evaporator being heated with steam under a pressure of from 1.3 to 1.4 atmospheres. The solution to be evaporated has a content of about 0.16 per cent of free sulphuric acid and the solution has added to it previously 0.1 per cent of sodium sulphate in the form of an aqueous solution and 0.01 per cent of aluminium oxide in the form of an aluminium sulphate solution. The crystals obtained from the resulting salt mash have a ratio of thickness to length of from about 1:5 while the said ratio when adding 0.01 per cent of aluminium oxide alone is 1:8.

Example 2

Ammonium sulphate solution of the same concentration as in Example 1 is evaporated to the same concentration at the same acid concentration and the same apparatus conditions. There are previously added to the ammonium sulphate solution 0.1 per cent of potassium sulphate and 0.01 per cent of aluminium oxide by the addition of a solution of potassium sulphate and a solution of aluminium sulphate. The crystals obtained from the salt mash have a ratio of thickness to length of about 1:4.

Example 3

Ammonium sulphate solution of the same concentration as in Example 1 is evaporated to the same concentration at the same acid concentration and the same apparatus conditions. There are previously added to the ammonium sulphate solution 0.1 per cent of magnesium sulphate and 0.01 per cent of aluminium oxide by the addition of a solution of magnesium sulphate and a solution of aluminium sulphate. The crystals obtained from the salt mash have a ratio of thickness to length of about 1:5.

Example 4

Ammonium sulphate solution of the same concentration as in Example 1 is evaporated to the same concentration at the same acid concentration and the same apparatus conditions. There are previously added to the ammonium sulphate solution 0.1 per cent of zinc sulphate and 0.01 per cent of aluminium oxide by the addition of a solution of zinc sulphate and a solution of aluminium sulphate. The crystals obtained from the salt mash have a ratio of thickness to length of from about 1:4 to 1:5.

Example 5

Ammonium sulphate solution of the same concentration as in Example 1 is evaporated to the same concentration at the same acid concentration and the same apparatus conditions. There are previously added to the ammonium sulphate solution 0.1 per cent of manganese sulphate and 0.01 per cent of aluminium oxide by the addition of a solution of manganese sulphate and a solution of aluminium sulphate. The crystals obtained from the salt mash have a ratio of thickness to length of from about 1:4 to 1:5.

This application is a division of our copending application Ser. No. 1,156, filed January 10, 1935.

What we claim is:

1. The process of producing coarsely crystalline ammonium sulphate by evaporating an acid aqueous solution of the sulphate which comprises adding to the solution to be evaporated small amounts both of a water-soluble aluminium salt and a water-soluble salt of zinc.

2. In the process as claimed in claim 1 employing the water-soluble aluminium salt and the water-soluble salt of zinc in the sulphate form.

3. The process of producing coarsely crystalline ammonium sulphate by evaporating an acid aqueous solution of the sulphate which comprises adding to the solution to be evaporated from 0.005 to 0.02 per cent of aluminium oxide in the form of a water-soluble aluminium salt and from 0.05 to 1 per cent of a water-soluble salt of zinc, the amounts being referred to the ammonium sulphate dissolved in the solution to be evaporated.

4. The process of producing coarsely crystalline ammonium sulphate by evaporating an acid aqueous solution of the sulphate which comprises adding to the solution to be evaporated 0.01 per cent of aluminium oxide in the form of a water-soluble aluminium salt and 0.1 per cent of a water-soluble salt of zinc, the amounts being referred to the ammonium sulphate dissolved in the solution to be evaporated.

5. A process of producing coarsely crystalline ammonium sulphate by evaporating under reduced pressure an aqueous solution of ammonium sulphate which contains 0.16 per cent of free sulphuric acid, 0.01 per cent of aluminium oxide in the form of aluminium sulphate and 0.1 per cent of the sulphate of zinc, the amounts being referred to the ammonium sulphate dissolved in the solution to be evaporated.

CARL RUMSCHEIDT.
ARNOLD JELTSCH.
ANTON STRZYZEWSKI.
HEINRICH HEGGE.